United States Patent
Kawano et al.

[19]

[11] Patent Number: 6,069,734
[45] Date of Patent: May 30, 2000

[54] HIGH RESOLUTION MACROSCOPE

[75] Inventors: Yoshiro Kawano, Bethpage; Keisuke Tamura, Forest Hills, both of N.Y.

[73] Assignee: Olympus America, Inc., Melville, N.Y.

[21] Appl. No.: 08/974,482

[22] Filed: Nov. 19, 1997

[51] Int. Cl.[7] .............................. G02B 21/06; G02B 21/00
[52] U.S. Cl. .......................... 359/390; 359/368; 359/385
[58] Field of Search .................................. 359/368, 372, 359/385, 377, 390

[56] References Cited

U.S. PATENT DOCUMENTS

| | | | |
|---|---|---|---|
| 4,027,951 | 6/1977 | Mori et al. | 359/658 |
| 5,059,005 | 10/1991 | Kawano | 359/654 |
| 5,337,177 | 8/1994 | Toyoda et al. | 359/368 |
| 5,371,624 | 12/1994 | Nagano et al. | 359/389 |
| 5,500,770 | 3/1996 | Zinter et al. | 359/368 |

FOREIGN PATENT DOCUMENTS

| | | |
|---|---|---|
| 60-118596 | 6/1985 | Japan . |
| 61-36966 | 10/1986 | Japan . |
| 62-240915 | 10/1987 | Japan . |
| 5-127087 | 5/1993 | Japan . |

OTHER PUBLICATIONS

"Olympus System Microscope BX, BX50/BX40", *Olympus Optical Co., LTD.*, Tokyo, Japan, undated, pp. 1–22.

Ratzlaff, E. et al. (1991) "A Tandem–Lens Epifluorescence Macroscope: Hundred–Fold Brightness Advantage for WIde–Field Imaging", *Journal of Neuroscience Methods*, 36:127–137.

*Primary Examiner*—Cassandra Spyrou
*Assistant Examiner*—Jennifer Winstedt
*Attorney, Agent, or Firm*—Scully, Scott, Murphy & Presser

[57] ABSTRACT

A low magnification, high resolution macroscope. The macroscope includes a body section, a stage for supporting a specimen, and a lens system including an objective lens assembly having a diameter greater than 22 mm. for forming an enlarged, intermediate image of the specimen on the stage. The macroscope also includes an eyepiece for forming a further enlarged, focused image of the specimen. Preferably, the macroscope further includes an illumination system for illuminating the specimen, and this illumination system includes a light source and a mirror. The mirror directs light from the light source, through the objective lens assembly and onto the specimen, and this mirror has a diameter larger than the diameter of the objective lens assembly. With this arrangement, the mirror directs light onto the entire horizontal cross-sectional area of the objective lens assembly, and also the mirror does not restrict the size of the image of the specimen transmitted from the objective lens assembly.

17 Claims, 13 Drawing Sheets

| N.A | | 0.24 | | | | | |
|---|---|---|---|---|---|---|---|
| W.D. | | 25 | | | | | |
| Magnification | | 4 | | | | | |
| Cover Glass thickness | | | 0.17 | mm | | | |
| Objective Lens Focal length | | | 45 | mm | | | |
| Object to thread (F) | | | 80 | mm | | | |

Objective Lens Data

| Surf. Number | Radius | Thickness | Glass Name | Nd * | Vd ** | Lens Diameter | Focal Length *** |
|---|---|---|---|---|---|---|---|
| 1 | -56.11754 | 6.00 | FSL5 | 1.48749 | 70.2 | 17 | 75.0966 |
| 2 | -22.93176 | 2.00 | | | | | |
| 3 | 36.81489 | 8.00 | FPL53 | 1.43875 | 95.0 | 21 | 162.382 |
| 4 | -23.88066 | 3.00 | LAL7 | 1.65160 | 58.8 | 21 | |
| 5 | -235.73370 | 21.56 | | | | | |
| 6 | 200.94990 | 3.00 | LAL18 | 1.72916 | 54.7 | 23 | 112.725 |
| 7 | 35.48417 | 8.00 | FPL51 | 1.49700 | 81.6 | 23 | |
| 8 | -42.70279 | | | | | | |

Tube Lens Data

| | |
|---|---|
| Lens type | 1 group 2 pieces |
| Focal Length | 180 mm |
| Lens diameter | 36 |

Nd*: Refractive index for glass
Vd**: Abbe dispersion
Focal Length ***: Focal length of lens group

Fig. 3
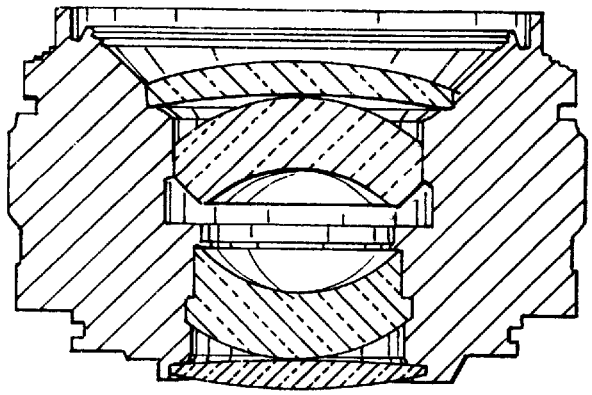
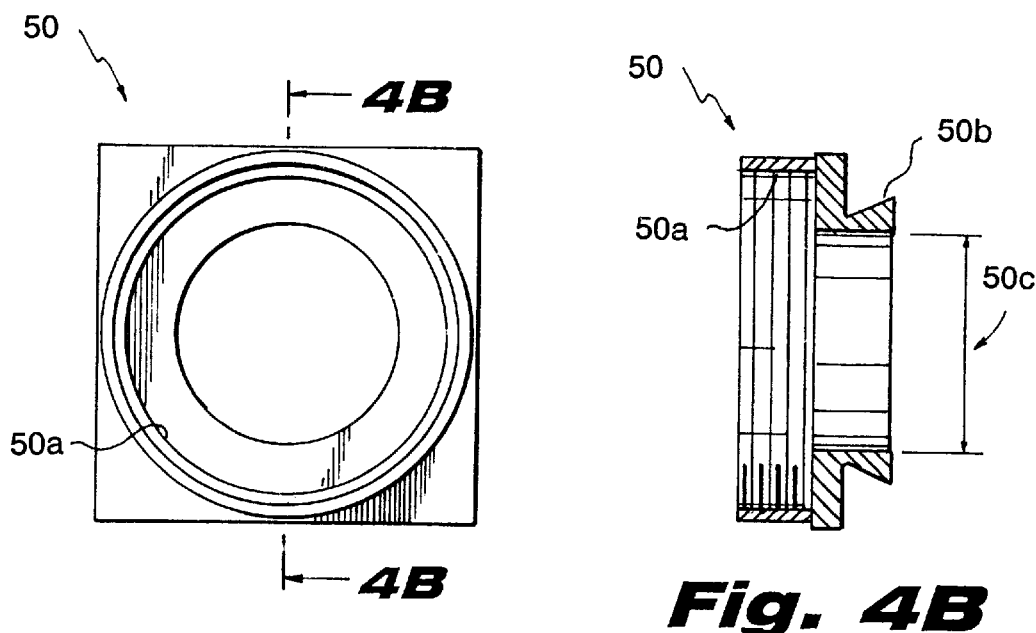
Fig. 4A
Fig. 4B
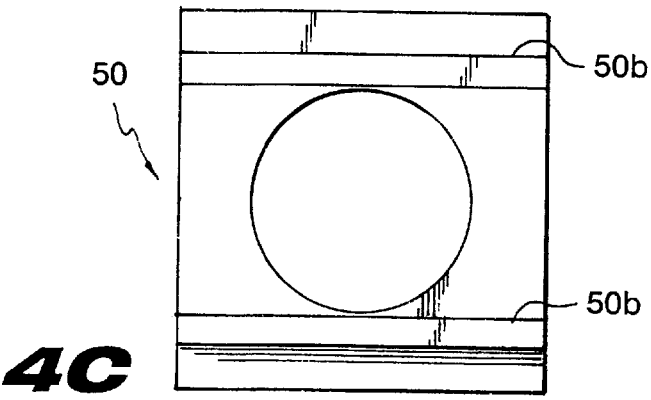
Fig. 4C

| N.A | | 0.35 | | | | | |
|---|---|---|---|---|---|---|---|
| W.D. | | 25 | | | | | |
| Magnification | | 4 | | | | | |
| Cover Glass thickness | | 0.17 | mm | | | | |
| Objective Lens Focal length | | 45 | mm | | | | |
| Object to thread (E) | | 93 | mm | | | | |
| | | | | | | | |
| Objective Lens Data | | | | | | | |
| Surf. Number | Radius | Thickness | Glass Name | Nd * | Vd ** | Lens Diameter | Focal Length *** |
| 1 | -57.39335 | 6.00 | FSL5 | 1.48749 | 70.2 | 26 | 122.323 |
| 2 | -30.24738 | 2.00 | | | | | |
| 3 | 55.63062 | 8.00 | FPL51 | 1.49700 | 81.6 | 30 | 89.7763 |
| 4 | -26.38141 | 2.00 | LAL7 | 1.65159 | 58.5 | 30 | |
| 5 | -79.36066 | 6.00 | | | | | |
| 6 | 3358.89800 | 3.00 | LAL64 | 1.69680 | 56.5 | 32 | 258.596 |
| 7 | 54.73890 | 6.00 | FPL52 | 1.45600 | 90.3 | 32 | |
| 8 | -57.55272 | 20.39 | | | | | |
| 9 | 145.18980 | 3.00 | LAL18 | 1.72915 | 54.7 | 33 | 221.086 |
| 10 | 37.31634 | 8.00 | FPL51 | 1.49700 | 81.6 | 33 | |
| 11 | -87.45487 | | | | | | |
| | | | | | | | |
| | | | | | | | |
| Tube Lens Data | | | | | | | |
| Lens type | | 1 group 2 pieces | | | | | |
| Focal Length | | 180 mm | | | | | |
| Lens diameter | | 40 | | | | | |
| | | | | | | | |
| Nd*: Refractive index for glass | | | | | | | |
| Vd**: Abbe dispersion | | | | | | | |
| Focal Length ***: Focal length of lens group | | | | | | | |

Fig. 10

| | | | | | | |
|---|---|---|---|---|---|---|
| N.A | | 0.24 | | | | |
| W.D. | | 25 | | | | |
| Magnification | | 4 | | | | |
| Cover Glass thickness | | 0.17 | mm | | | |
| Objective Lens Focal length | | 45 | mm | | | |
| Object to thread (F) | | 80 | mm | | | |
| | | | | | | |
| Objective Lens Data | | | | | | |
| Surf. Number | Radius | Thickness | Glass Name | Nd * | Vd ** | Lens Diameter | Focal Length *** |
| 1 | -56.11754 | 6.00 | FSL5 | 1.48749 | 70.2 | 17 | 75.0966 |
| 2 | -22.93176 | 2.00 | | | | | |
| 3 | 36.81489 | 8.00 | FPL53 | 1.43875 | 95.0 | 21 | 162.382 |
| 4 | -23.88066 | 3.00 | LAL7 | 1.65160 | 58.8 | 21 | |
| 5 | -235.73370 | 21.56 | | | | | |
| 6 | 200.94990 | 3.00 | LAL18 | 1.72916 | 54.7 | 23 | 112.725 |
| 7 | 35.48417 | 8.00 | FPL51 | 1.49700 | 81.6 | 23 | |
| 8 | -42.70279 | | | | | | |
| | | | | | | |
| Tube Lens Data | | | | | | |
| Lens type | 1 group 2 pieces | | | | | |
| Focal Length | 180 mm | | | | | |
| Lens diameter | 36 | | | | | |
| | | | | | | |
| Nd*: Refrective index for glass | | | | | | |
| Vd**: Abbe dispersion | | | | | | |
| Focal Length ***: Focal length of lens group | | | | | | |

*Fig. 13*

| N.A | | 0.15 | | | | | |
|---|---|---|---|---|---|---|---|
| W.D. | | 15 | | | | | |
| Magnification | | 2 | | | | | |
| Cover Glass thickness | | 0.17 | mm | | | | |
| Objective Lens Focal length | | 90 | mm | | | | |
| Object to thread (G | | 75 | mm | | | | |
| | | | | | | | |
| Objective Lens Data | | | | | | | |
| Surf. Number | Radius | Thickness | Glass Name | Nd * | Vd ** | Lens Diameter | Focal Length *** |
| 1 | 71.37115 | 2.96 | TIH53 | 1.84665 | 23.8 | 15 | 29.6311 |
| 2 | -37.94961 | 6.58 | | | | | |
| 3 | 73.63937 | 1.35 | PBH6 | 1.80517 | 25.4 | 22 | -22.5904 |
| 4 | 14.46702 | 22.29 | | | | | |
| 5 | 74.55673 | 2.00 | TIH53 | 1.84665 | 23.8 | 22 | -612.9640 |
| 6 | 121.17940 | 2.00 | LAL18 | 1.72915 | 54.7 | 23 | |
| 7 | 59.13919 | 4.50 | | | | | |
| 8 | -79.47628 | 1.85 | LAH58 | 1.88299 | 40.8 | 24 | -347.7800 |
| 9 | 59.33673 | 5.00 | FPL53 | 1.43875 | 95.0 | 24 | |
| 10 | -29.86835 | 9.01 | | | | | |
| 11 | -289.37920 | 7.00 | FPL51 | 1.49700 | 81.6 | 34 | 58.8549 |
| 12 | -26.77880 | | | | | | |
| | | | | | | | |
| | | | | | | | |
| Tube Lens Data | | | | | | | |
| Lens type | 1 group 2 pieces | | | | | | |
| Focal Length | 180 mm | | | | | | |
| Lens diameter | 39 | | | | | | |
| | | | | | | | |
| Nd*: Refrective index for glass | | | | | | | |
| Vd**: Abbe dispersion | | | | | | | |
| Focal Length ***: Focal length of lens group | | | | | | | |

*Fig. 16*

HIGH RESOLUTION MACROSCOPE

BACKGROUND OF THE INVENTION

This invention generally relates to macroscopes; and more specifically, to a low magnification, high resolution and bright image macroscope that is simple to assemble.

Macroscopes are used to provide enlarged views of objects or specimens that are visible to the unaided eye. For instance, these instruments may be used to provide magnified views of whole groups of cells or small insects. In one type of application, for example, a small insect or a cluster of cells may be stained with a fluorescent dye and then illuminated with light while under observation in a macroscope. The macroscope enables a viewer to observe and to study how the cluster of cells react as a whole and how cells interact with each other.

Microscopes are not particularly well suited for low magnification, high resolution observations. This is so for a number of reasons. First, there are physical limitations on the size of a specimen that can be viewed and on the intensity with which a specimen can be illuminated using conventional microscopes. More specifically, conventional microscopes have more than two separate objective lens units on a rotating turret nosepiece that is mounted on the microscope frame. The objective lenses provide different magnification levels; and, for example, these objective lenses may magnify images by factors of ten, twenty, forty and one hundred respectively.

In use, the nosepiece is rotated to select the objective lens that is used to observe the specimen. In order to accommodate these objective lens units on a single nosepiece, conventionally, each objective lens is attached to the nosepiece via a mechanical thread of diameter 22.3 mm. This thread size places a physical limitation on the exit pupil diameter of the objective lens.

This size limitation affects the amount of light that can be transmitted or observed through the objective lens. To elaborate, the amount of light transmitted through a lens is proportional to the square of the diameter of the lens. Thus, if the diameter of a lens is doubled, the lens is able to transmit four times the light. Analogously, however, if the diameter of a lens is halved, the lens is able to transmit only one-fourth the light.

Spatial resolution of detail in a image that can be achieved with a lens is a function of the amount of light transmitted through the lens. The physical limitation due to thread size on the amount of light that can be transmitted through a microscope objective lens also acts to limit the spatial resolution that can be obtained with the lens.

This limitation particularly affects the light intensity that can be obtained with transmittance microscopes, where the specimen is illuminated with light from below the specimen. With these microscopes, the light passes through the specimen and on to the objective lens which forms an image of the specimen. Thus, the intensity with which the specimen is observed varies as a function of the second power of the diameter of the lens. The relationship is the same for reflection microscopes, where the specimen is illuminated from above through the objective lens and light reflected from the specimen is imaged by the objective.

The above-discussed limitation on the amount of light that can be transmitted through the objective lens also particularly limits the ability to observe fluorescence images through a microscope. This is so because, typically, high intensity light levels are needed to observe fluorescence images.

This limitation particularly affects the light intensity that can be obtained with fluorescence microscopes, where the specimen is illuminated through the objective lens. The illuminating light, typically called excitation light in fluorescence microscopy, is transmitted through the objective lens. This excitation light causes certain fluorescent molecules in the specimen to fluoresce. The light given off by this fluorescence is typically called emission light. The emission light is imaged through the objective lens. Thus, the intensity with which the specimen is observed varies as a function of the fourth power of the diameter of the lens.

SUMMARY OF THE INVENTION

An object of this invention is to improve macroscopes.

Another object of the present invention is to provide a low magnification, high resolution and bright image macroscope.

A further object of this invention is to provide a low magnification, high resolution macroscope that is simple to assemble.

These and other objectives are attained with a macroscope comprising a body section, a stage connected to the body section for supporting a specimen; and a lens system including an objective lens assembly having a mechanical thread diameter greater than 23 mm for forming an enlarged, intermediate image of the specimen on the stage. The macroscope also includes an eyepiece connected to the lens system that further enlarges the magnified image produced by the objective lens.

Preferably, the macroscope further comprises an illumination system for illuminating the specimen, and this illumination system includes a light source and a mirror. The mirror is located in the lens system, serving to direct light from the light source through the objective lens assembly and onto the specimen. This mirror has a diameter larger than the diameter of the objective lens assembly. With this arrangement, the mirror directs light onto the entire horizontal cross-sectional area of the objective lens assembly, and also the mirror does not restrict the size of the image of the specimen transmitted from the objective lens assembly.

In addition, preferably, the objective lens assembly satisfies the conditions:

$$22 \text{ mm} < \times NAOB \times FLOB,$$

$$20 \text{ mm} < FLOB < 150 \text{ mm, and}$$

$$10 \text{ mm} < WDOB < 100 \text{ mm},$$

where NAOB is the numerical aperture of the objective lens assembly, FLOB is the focal length of the objective lens assembly, and WDOB represents a working distance for the objective lens assembly.

Especially, preferably, the objective lens assembly satisfies the conditions:

$$27 < 2 \times NAOB \times FLOB,$$

Such conditions will further increase image intensity.

Further benefits and advantages of the invention will become apparent from a consideration of the following detailed description, given with reference to the accompanying drawings, which specify and show preferred embodiments of the invention.

MATERIALS USED IN THE INVENTION

If one uses UV light for fluorescence excitation in the invention, for example light of wavelength 340 nm for Fura-2 applications, the following glasses may be used. Glasses for such UV transmission should be chosen such that:

$$vd \geq -60n_d + 153.8$$

for $1.4 < n_d < 1.75$ or $$n_d \geq (-v_d + 153.8)/60$$

for $50 < v_d < 68$ where $v_d$ is the abbe dispersion of the glass and $n_d$ is the refractive index of the glass.

If the glass does not follow these condition, the macro objective lens is very difficult to transmit UV light.

BRIEF DESCRIPTION OF THE DRAWINGS

FIG. 3 shows an objective lens of the lens system.

FIGS. 4A–4C illustrate an adapter used to connect the objective lens of FIG. 3 to the body of the macroscope.

FIG. 10 is a table listing measurements of the lenses of the assembly shown in FIGS. 8 and 9.

FIG. 13 is a table providing measurements of the lenses of the assembly shown in FIGS. 11 and 12.

FIG. 16 is a table giving measurements of the lenses of the assemblies shown in FIGS. 14 and 15.

DETAILED DESCRIPTION OF THE PREFERRED EMBODIMENTS

Figure 1:
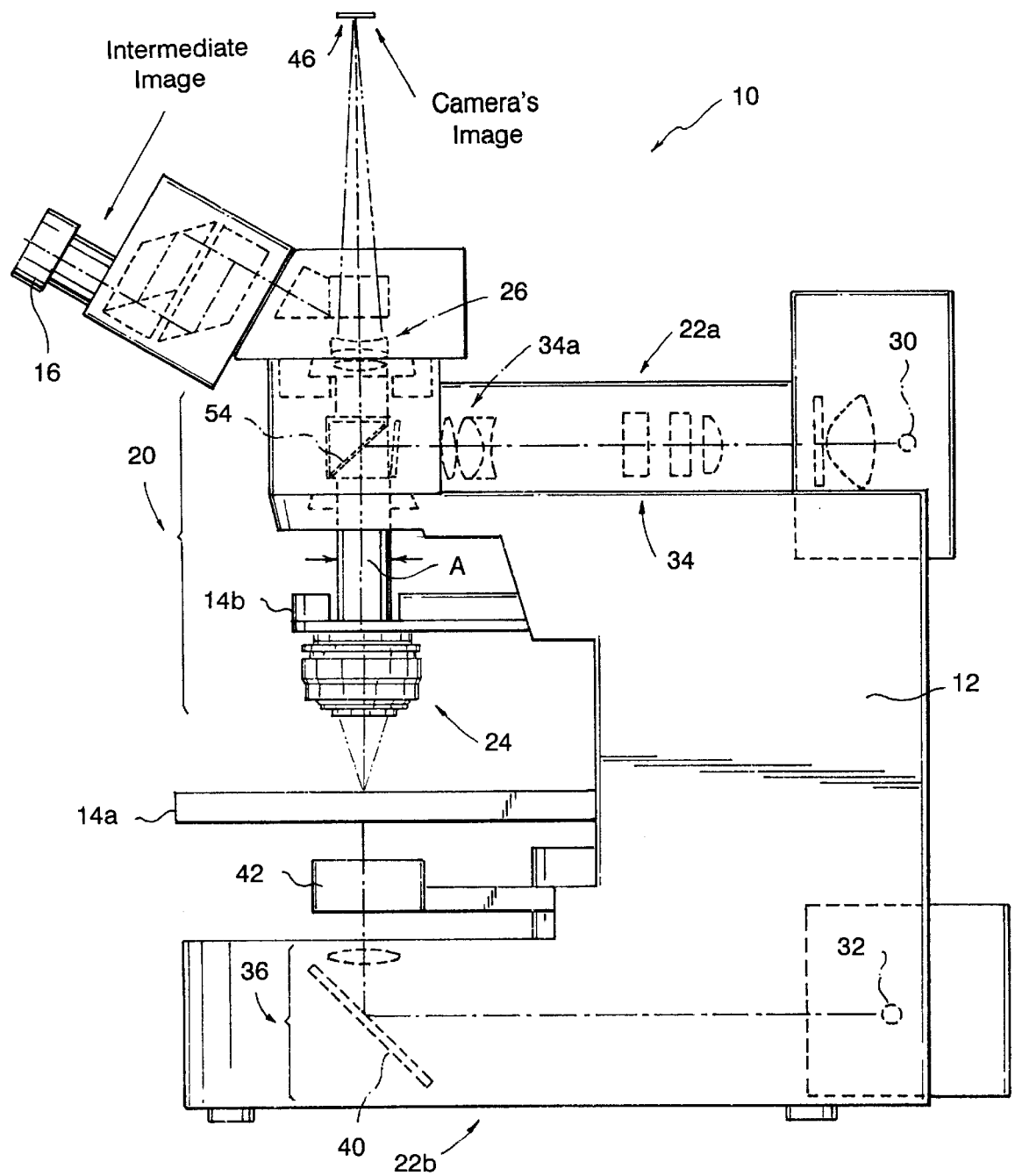
FIG. 1 shows a macroscope embodying the present invention.

FIG. 1 shows macroscope 10 generally comprising main body portion 12, stage 14a, focusing unit 14b, eyepiece 16, and lens system 20, and preferably the macroscope also includes illumination system 22a and 22b, 22a is a reflected light illuminator or fluorescence illuminator, and 22b is a transmitted light illuminator. With the embodiment of macroscope 10 shown in FIG. 1, lens system 20 includes objective lens assembly 24 and tube lens assembly 26.

In addition, illumination system 22a includes top light source 30 and lens assembly 34. Illumination system 22b includes bottom light source 32 and lens-mirror assembly 36.

Generally, body portion 12 supports the other elements of macroscope 10 and also serves as a handle to facilitate carrying the macroscope. Stage 14a is supported by body portion 12 and is used to support a specimen or object. Focusing unit 14b has adjusts specimen position for precise focusing of the intermediate image 46. Lens system 20 is used to produce an enlarged image of the specimen on stage 14a; and, in use, a person places the eye at eyepiece 16 to observe that enlarged image.

Illumination system 22a, 22b may be used to illuminate the specimen being viewed. More specifically, lens assembly 34 is provided to direct light from light source 30 onto stage 14a, from above the stage; and mirror 40 and condenser lens 42 are used to project light from light source 32 onto stage 14a, from beneath the stage. Preferably, top light source 30 is or includes a tungsten halogen lamp, mercury (Hg) lamp or xenon (Xe) lamp and collector lens, and bottom light source 32 includes a tungsten halogen lamp.

Figure 2:
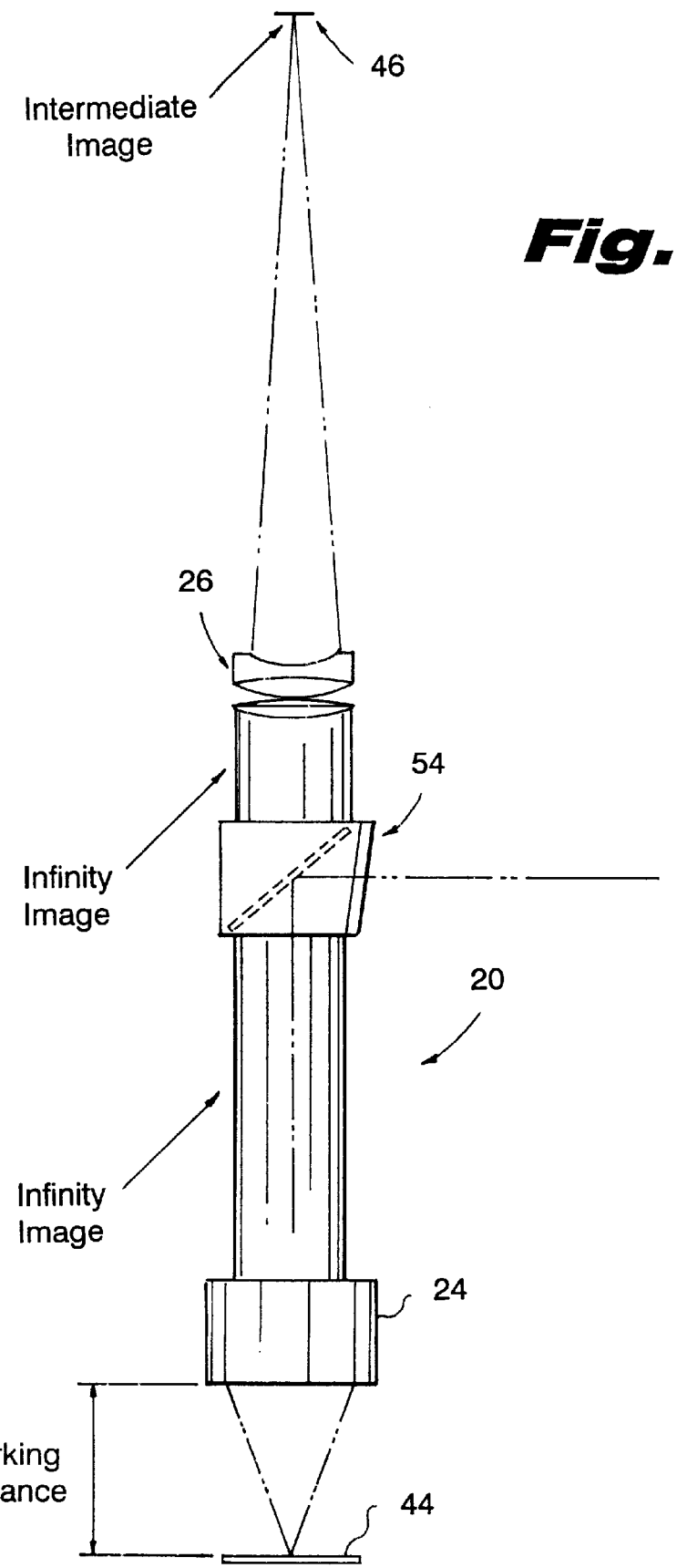
FIG. 2 is a schematic drawing of the lens system of the macroscope.

Lens system 20 is schematically illustrated in greater detail in FIG. 2. As shown therein, a specimen 44 on stage 14a is located at the front focal plane of objective lens assembly 24; and that lens assembly projects light in parallel unfocused bundles to the tube lens assembly 26. The tube lens assembly produces a focused intermediate image of the specimen at the back focal plane for tube lens, 46. For video observation the camera should be placed at intermediate image 46. With reference to FIGS. 1 and 2, that intermediate image is further enlarged by eyepiece 16 to produce a final enlarged image on an image plane, and that final image is seen by an observer looking through the eyepiece. The distance between objective lens assembly 24 and the object plane 44 is referred to as the working distance, WD, of the objective lens assembly.

Objective lens assembly 24 has a diameter greater than 23 millimeters, and for example, the objective lens assembly may have 50 millimeters focal length. This provides a comparatively large or wide field of view and also allows substantial amounts of light to be transmitted through the lens. As a result, objective lens assembly 24 may be used to observe relatively large, macroscopic objects at high intensity levels and thus at a high resolution. In addition, preferably the objective lens assembly satisfies the following condition:

$$22 \text{ mm} < 2 \times NAOB \times FLOB,$$

where NAOB is the numeric aperture for the objective lens assembly, and FLOB is the focal length of that lens assembly.

Preferably, the focal length of the objective lens assembly is between 20 mm and 150 mm, and the working distance of the objective lens is between 10 mm and 100 mm.

In addition, preferably the objective lens assembly includes more than two optical units. The optical unit on the specimen side of the objective lens assembly has two sets of positive focal length lens groups. The distance from the objective lens mechanical thread to the object, called the parfocal distance, is between 60 mm and 150 mm. For parfocal distances less than 60 mm it is very difficult to design a macro lens, because the focal length of the macro lens is close to or greater than the parfocal distance.

Any suitable objective lens assembly 24 may be used in the present invention. Preferably, the objective lens is removably mounted in macroscope 10. Even more preferably, as discussed in greater detail below, objective lens assembly 24 may be substituted for a conventional microscope nosepiece.

With an embodiment of the invention that has been actually reduced to practice, objective lens assembly 24 is a single lens reflex camera lens such as an Olympus SLR Lens ZIKO AUTO-S 50 mm F Number 1.8, shown in FIG. 3. In addition, with this embodiment of macroscope 10, an adapter or connector is used to releasably mount that lens in the macroscope.

A suitable adapter is shown in detail at 50 in FIGS. 4A–4C; and with reference to these Figures, connector 50 includes a frame member having cylindrical threaded portion 50a and dove-tail portion 50b. Threaded portion 50a is adapted to thread onto camera lens 24, and dove-tail portion 50b is adapted to fit into a complementary shaped recess on macroscope 10, in a dove-tail fit therewith, thereby connecting the camera lens in lens system 20. Preferably, the connector has a diameter 50c equal to or larger than the diameter of the objective lens assembly, and thus preferably has a diameter of 23 mm or more.

Figure 5A:
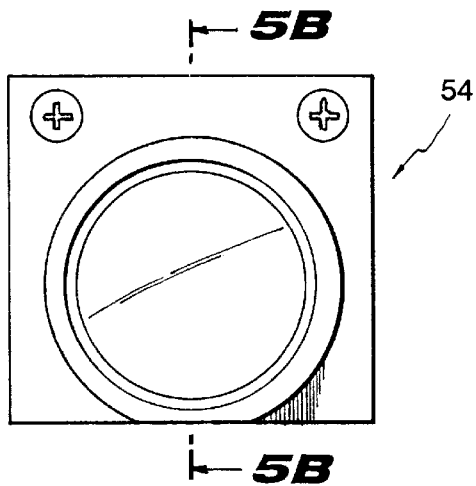
FIGS. 5A–5C show a mirror that is located in the lens system.
Figure 5B:
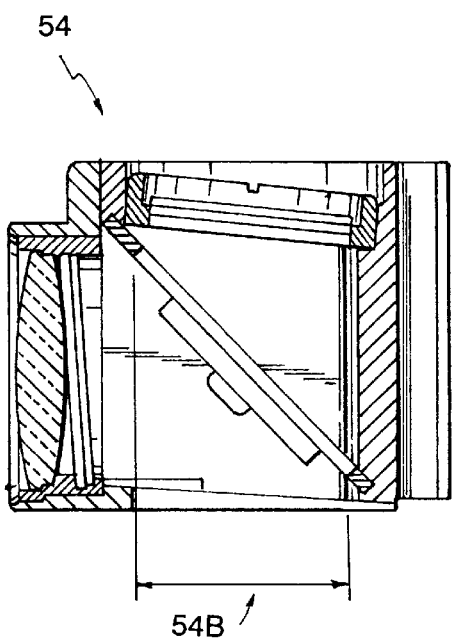
Figure 5C:
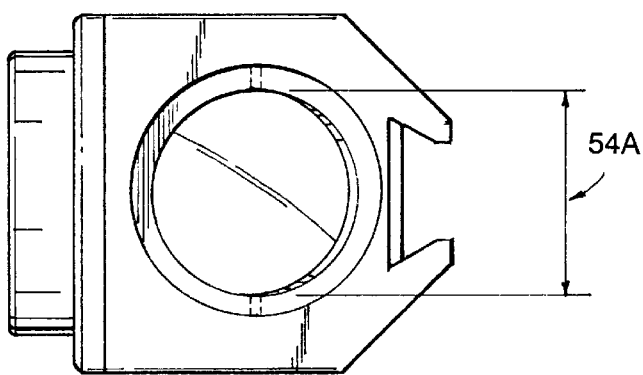

As shown in FIGS. 1 and 2, mirror 54 is located in lens system 20, between objective lens assembly 24 and tube lens assembly 26. Mirror 54 is shown in greater detail in FIGS. 5A–5C; and the mirror may be, for example, a dichromatic mirror, a polychromatic mirror, or a half mirror. Preferably, the mirror has a valid diameter 54b equal to or larger than the diameter of the objective lens assembly, and thus preferably has a diameter 54A of at least 23 mm. In this way, first, the mirror is able to direct light through the objective lens over the entire horizontal cross-section of that lens, and second, the mirror does not restrict the horizontal cross-sectional area of the upward transmission of any of the light directed upward from the objective lens. In addition, preferably the lens focal length (FILL) for a fluorescent illuminator 34a, which is close to mirror 54, is greater than 50 mm.

As will be understood by those of ordinary skill in the art, body portion 12, stage 14a, eyepiece 16, and illumination system 22 of macroscope 10 may be made, or comprised of, conventional elements. Also, macroscope 10 may be provided with additional features or items not specifically disclosed herein.

Preferably focus module 14b is supported by body portion 12 for vertical movement, and the vertical position of the focus unit may be adjusted to keep objective lens assembly 24 focused on the specimen placed on the stage. Any suitable mechanism (not shown) may be provided to move focus unit 14b upward and downward.

Figure 6:
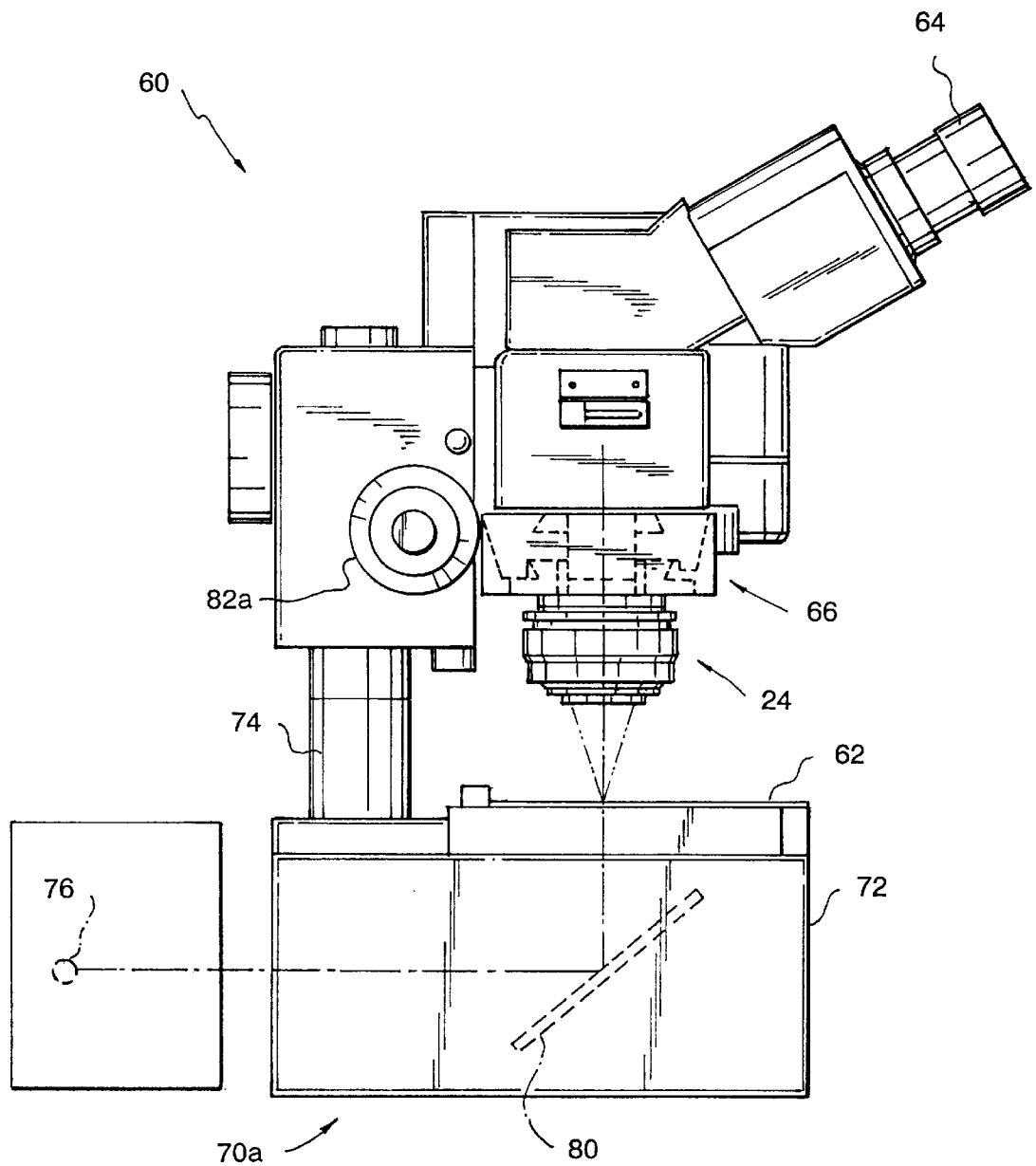
FIGS. 6 and 7 show a second embodiment of the macroscope of this invention.
Figure 7:
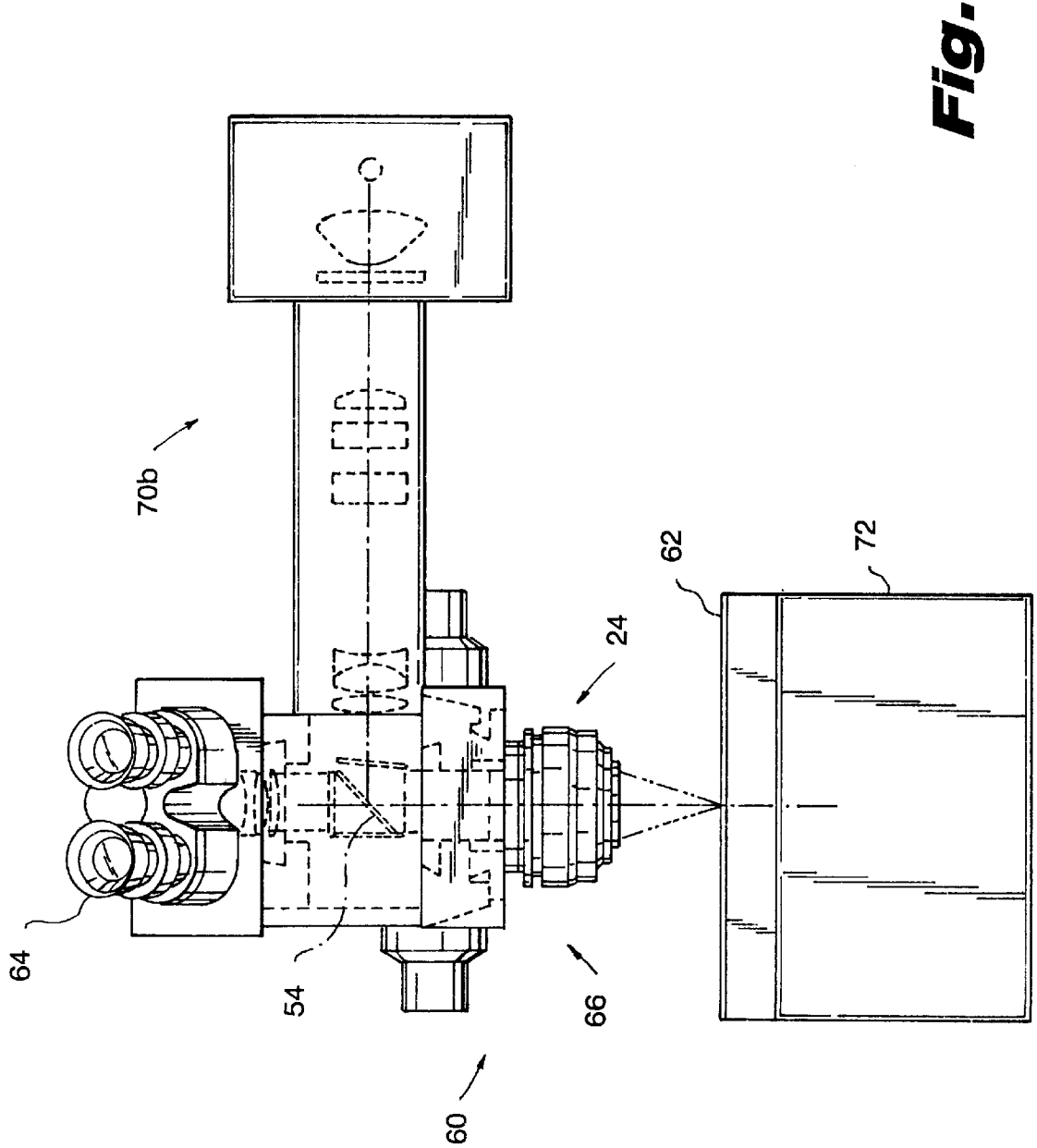

FIGS. 6 and 7 show an alternate macroscope 60 also embodying the present invention. Macroscope 60 is very similar to macroscope 10, and includes stage 62, eyepiece 64, lens system 66 and transmitted illumination system 70a, reflection or fluorescence illuminator 70b and lens system 66 includes objective lens assembly 24. A principal difference between macroscopes 10 and 60 is that the latter macroscope includes base 72 and post 74 instead of body portion 12. With macroscope 60, stage 62 is mounted on base 72, and bottom lamp 76 and mirror 80 may be located inside that base. Also, post 74 is connected to and extends upwards from base 72 to connect upper and lower elements of the macroscope 60. In addition, with macroscope 60, focusing knob 82a is used to move lens system 66 upward and downward relative to stage 62 to keep objective lens assembly 24 focused on the specimen on the stage.

An important advantage of both macroscopes 10 and 60 is that they are both very simple to make; and, in particular, can be assembled by making relatively simple modifications to commercially available microscopes, specifically Olympus microscopes BX50WI and BX30. To convert these microscopes to macroscopes 10 and 60, the nosepieces of the microscopes are removed and replaced with objective lens 24-adapter 50 combination. An important, unique attribute of the above-identified microscopes that enables this effective conversion is that mirror 54, which is on both of these microscopes, is large enough so that the mirror does not restrict either the size of the illuminating light beam transmitted downward onto the specimen being viewed, or the size of the image beam transmitted upward from the objective lens assembly 24. The diameter of mirror 54 should be at least 23 mm.

Figure 8:
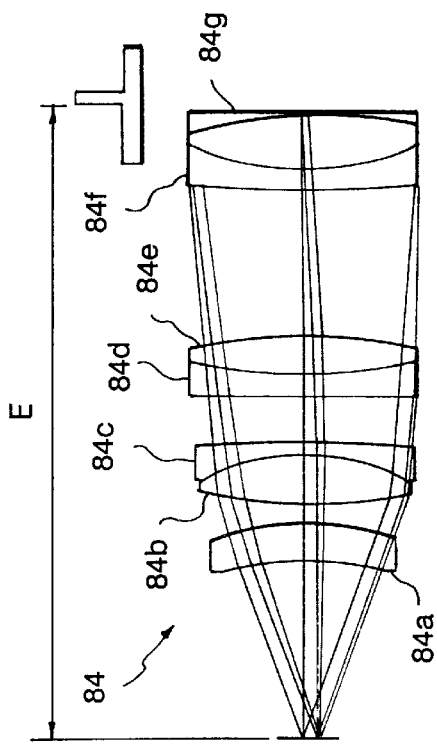
FIGS. 8 and 9 illustrate an alternate objective lens assembly.
Figure 9:
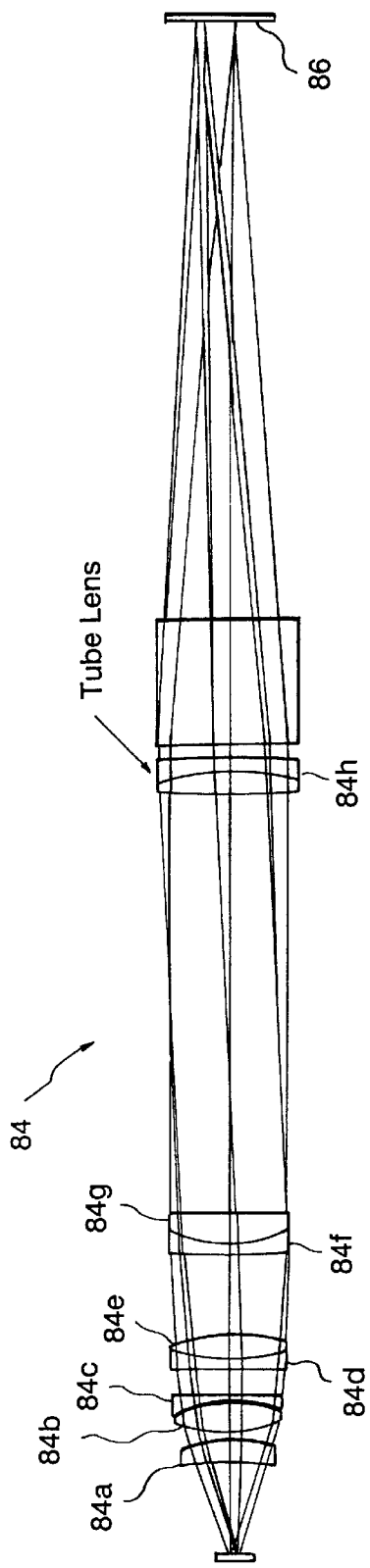

An alternate objective lens assembly, which may be used in either macroscopes 10 or 60, is shown at 84 in FIG. 8. This assembly comprises a series of individual lenses 84a, 84b, 84c, 84d, 84e, 84f, 84g arranged in sequence as shown in the Figure. The distance from the image plane to the objective mechanical thread is E. FIG. 9 schematically illustrates how this lens assembly 84 may be used to provide three focused images at points on focal plane 86. 84h is single group type tube lens. The tables of FIG. 10 provide various measurements and other data relating to the lenses of assembly 84. This 4× macro lens has good UV transmittance because this macroobjective has high transmit glass materials.

Figure 11:
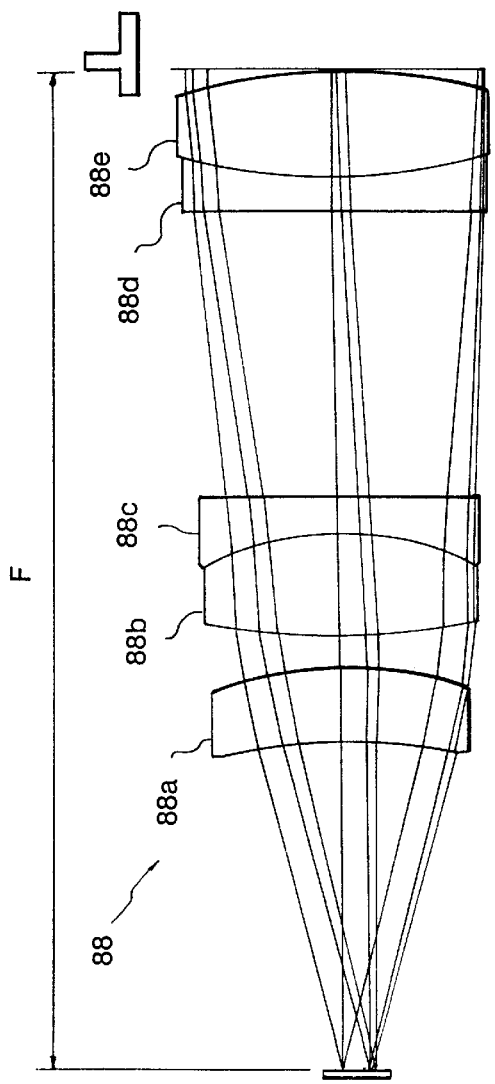
Figs. 11 and 12 show another alternate objective lens assembly.
Figure 12:
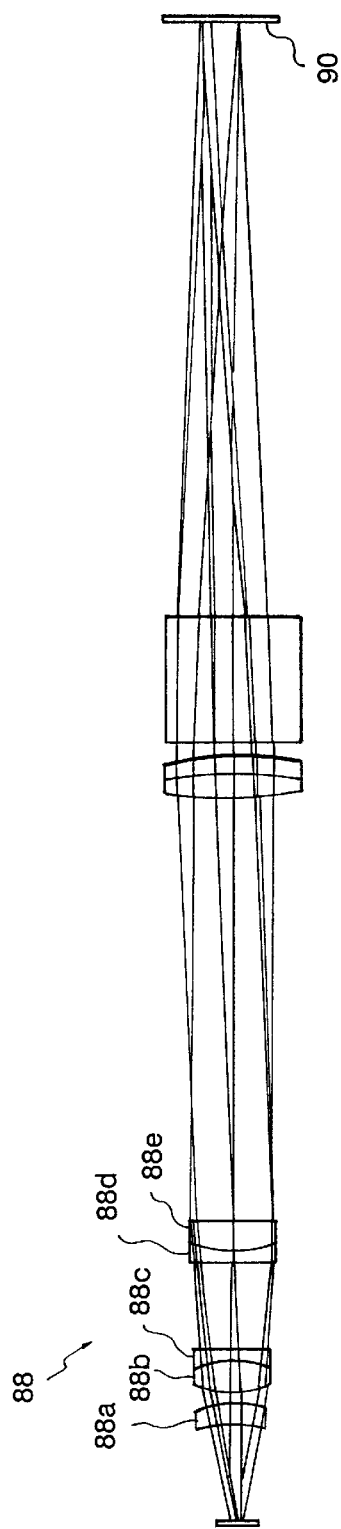

FIG. 11 illustrates another, alternate objective lens assembly 88 comprising a series of individual lenses 88a, 88b, 88c, 88d, 88e arranged in sequence as shown in the Figure; and FIG. 12 schematically shows how this assembly 88, which may be used in either macroscope 10 or macroscope 60, may be employed to produce three focused images at points on focal plane 90. The distance from the image plane to the objective mechanical thread is F. The tables of FIGS. 13 provide various measurements and other data relating to the lenses of assembly 88. This 4× macro lens has good UV transmit because this macroobjective has high transmit glass materials.

Figure 14:
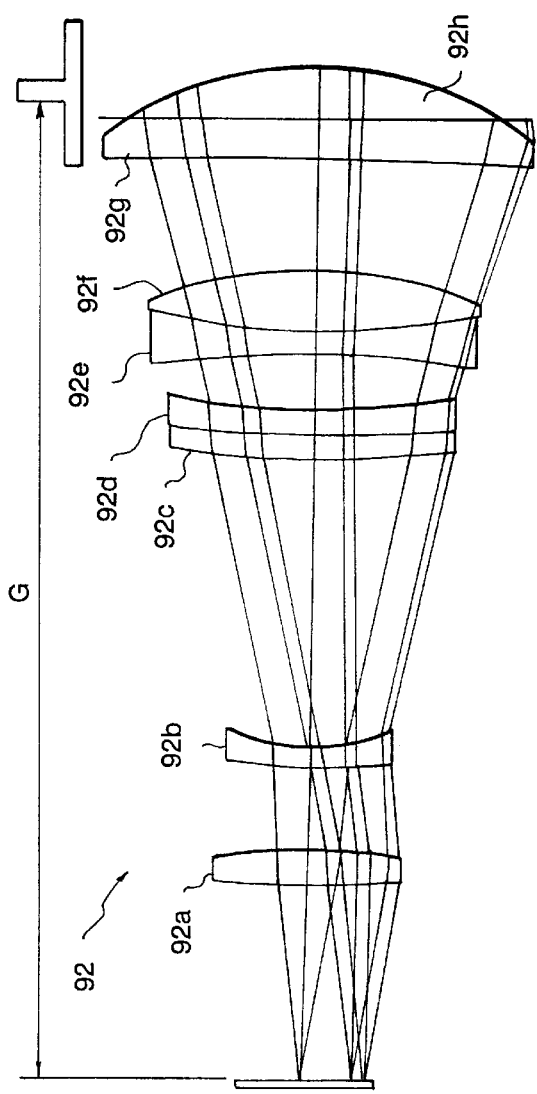
FIGS. 14 and 15 illustrate a further alternate objective lens assembly.
Figure 15:
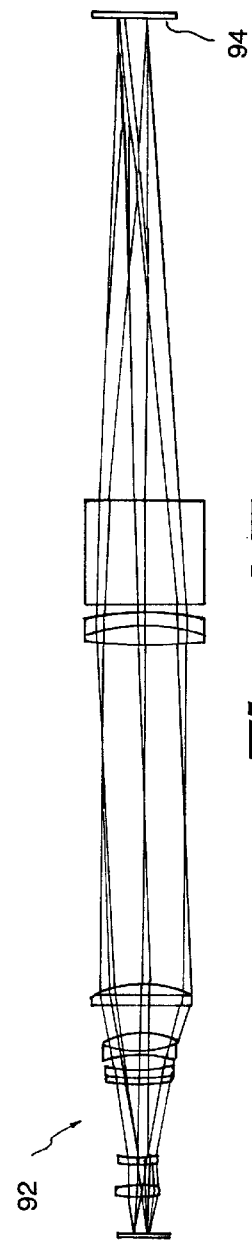

A still further, alternate objective lens assembly is illustrated at 92 in FIG. 14, and this assembly comprises a series of individual lenses 92a, 92b, 92c, 92d, 92e, 92f, 92g, 92h positioned in sequence as shown in the Figure. FIG. 15 schematically shows how this lens assembly 92, which may be used in either macroscopes 10 or 60, may be used to provide three focused images at points in focal plane 94. The distance from the image plane to the objective mechanical thread is G. The tables of FIGS. 16 provide various measurements and other data relating to the lenses of assembly 92.

Figure 17:
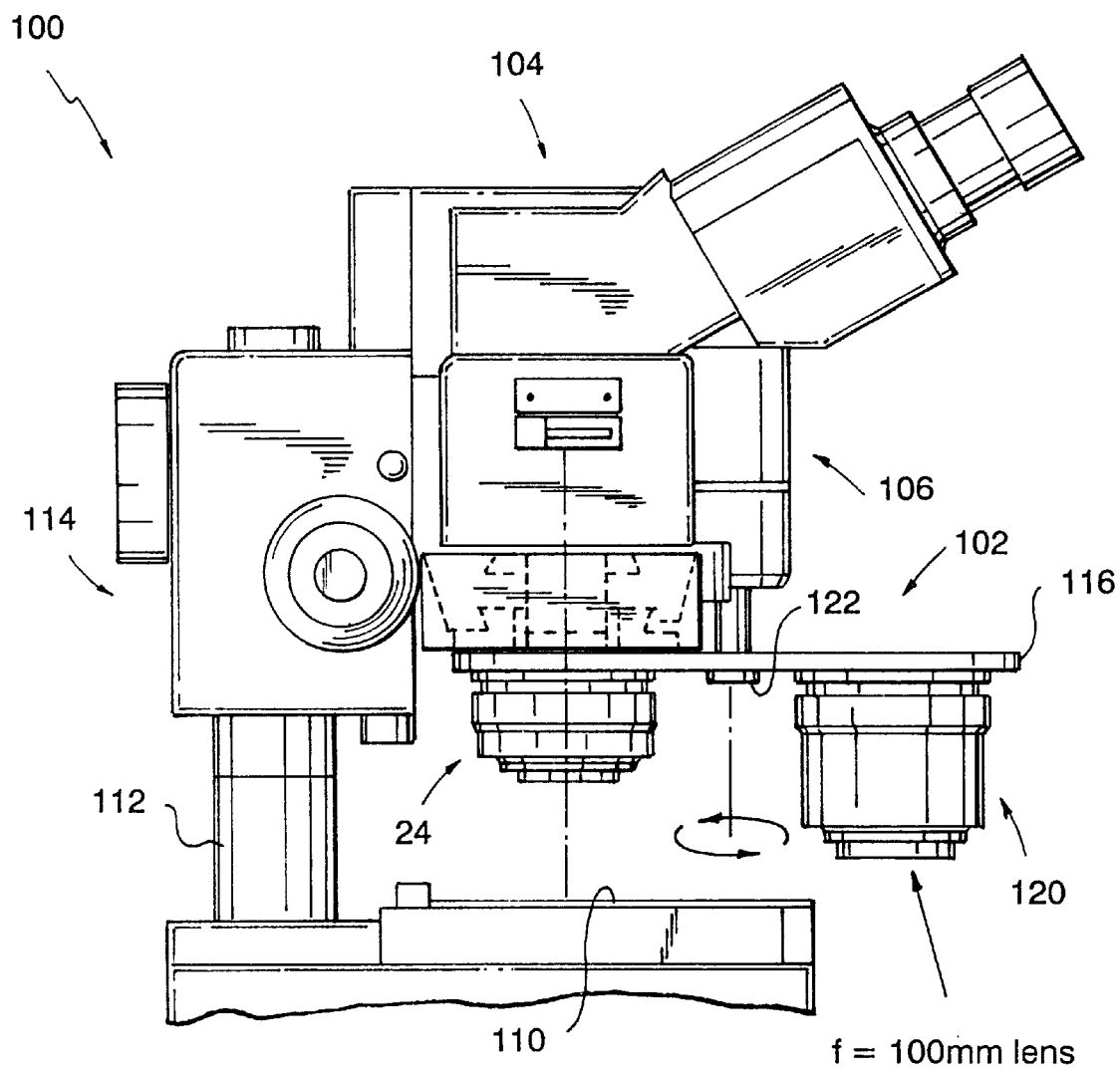
FIG. 17 shows an alternate embodiment of a macroscope incorporating teachings of the present invention.

FIG. 17 shows a further macroscope 100 also embodying teachings of the present invention. Macroscope 100 is similar to macroscope 60, and includes lens system 102, eyepiece 104, illumination section 106, base 110 and post 112. Macroscope 100 further includes a rack and pinion assembly 114 that is used to mount elements 102, 104 and 106 on post 112 for vertical movement therealong. Also, a stage may be mounted on base 110 to support a specimen.

With macroscope 100, lens system 102 includes a nosepiece 116 including objective lens assembly 24 and another lens assembly 120, which may be a conventional microscope objective lens unit. For example, lens assembly 120 is a 100 mm focal length objective lens. Nosepiece 116 is rotatably mounted on illumination section 106, via mounting means 122, so that each of the lens units 24 and 120 may be rotated into a position along the optical axis of the macroscope. In this way, each of the lens assemblies 24 and 120 may be used, one at a time, to form a respective enlarged image of a specimen on the base or stage of the macroscope, and macroscope 100 may thus alternately function as either a standard microscope or as a low magnification, high resolution macroscope.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. A macroscope comprising:
   a body section;
   a stage connected to the body section for supporting a specimen;
   a lens system including an objective lens assembly for forming an enlarged, intermediate image of the specimen on the stage, said objective lens assembly satisfying the following condition;

$$21.6 \text{ mm} < 2 \times NAOB \times FLOB < 31.5 \text{ mm},$$

where NAOB is the numerical aperture of the objective lens assembly, and FLOB is the focal length of the objective lens assembly; and
   an eyepiece connected to the lens system for forming a further enlarged, focused image of the specimen.

2. A macroscope according to claim 1, further comprising an illumination system for illuminating the specimen, and wherein the illumination system includes:
   (i) a light source, and
   (ii) a mirror located in the lens system for directing light from the light source, through the objective lens assembly and onto the specimen; said mirror has a valid diameter larger than the diameter of the objective lens assembly so that the mirror directs light onto the entire horizontal cross-sectional area of the objective lens assembly.

3. A macroscope according to claim 2, wherein the illumination system includes a fluorescent illuminator lens unit, located close to the mirror, and having a lens focal length greater than 50 mm.

4. A macroscope according to claim 1, further including an adapter releasably connecting the objective lens assembly in the lens system.

5. A macroscope according to claim 4, wherein the adapter includes a threaded portion attached to the objective lens assembly, and a dove-tail portion releasably held in the lens system.

6. A macroscope according to claim 1, wherein said macroscope is attached to microscope objective lenses, said microscope objective lenses having a magnification of 4 to 100 times and having an exit pupil diameter less than 22 mm.

7. A macroscope according to claim 1, wherein the macroscope has macro objective lenses, said lenses satisfy the following condition:

$$20 \text{ mm} < FLOB < 150 \text{ mm},$$

wherein the reference symbol FLOB represents the focal length for the macro objective lens.

8. A macroscope according to claim 1, wherein said macroscope has a macro objective lens, said lens has a working distance which satisfies the following condition:

$$10 \text{ mm} < WDOB < 100 \text{ mm},$$

wherein the reference symbol WDOB represents the working distance for the macro objective lens.

9. A macroscope according to claim 1, wherein said macroscope has macro objective lenses and a mechanical thread for securing said objective lenses to the macroscope, said lenses satisfy the following object to mechanical thread condition:

$$60 \text{ mm} < PF < 150 \text{ mm},$$

wherein the reference symbol PF represents the distance from object to mechanical thread for macro objective lens, also known as parfocal distance.

10. A macroscope according to claim 1, wherein said macroscope has an optical system, said optical system comprising one of a finite optical system or an infinity optical system.

11. A macroscope according to claim 1, wherein said macroscope has a macro objective lens, said lens constitutes 3 optical units:
    a first optical unit on the specimen side of the macro-objective lens has at least one positive focal length lens power;
    a second optical unit from center of macro-objective lens has at least one negative focal length lens power; and
    a third optical unit on the image side of macro objective side of macro objective lens has at least one positive focal length lens power.

12. A macroscope according to claim 1, wherein at least one set of the lenses comprising the objective lens assembly satisfies at least one of the conditions:

$$V_d \geq -60 n_d + 153.8$$

for $1.4 < n_d < 1.75$ and $$n_d \geq (-V_d + 153.8)/60$$

for $50 < V_d < 68$
    where $V_d$ is the abbe dispersion of a glass from which said one set of lens is fabricated and $n_d$ is the refractive index of the glass.

13. A method for assembling a macroscope from a microscope having a body section, a stage connected to the body section for supporting a specimen, a lens system adapted to include a removable nosepiece having a plurality of objective lens units for forming an enlarged, intermediate image of the specimen on the stage, and an eyepiece connected to the lens system for forming a further enlarged, focused image of the specimen, the method comprising connecting to the lens system an objective lens assembly, in place of said nosepiece, said objective lens assembly satisfying the following condition;

$$21.6 \text{ mm} < 2 \times NAOB \times FLOB < 31.5 \text{ mm}$$

where NAOB is the numerical aperture of the objective lens assembly, and FLOB is the focal length of the objective lens assembly to form an enlarged intermediate image of a wide field of view.

14. A method according to claim 13, wherein the connecting step includes the steps of:
    connecting said objective lens assembly to an adapter; and
    connecting the adapter to the lens system.

15. A method according to claim 13, wherein the microscope includes an illumination system having a light source and a mirror for directing light from the light source, downward onto the stage, the method further including the step of maintaining an unrestricted path upward through the mirror to transmit the intermediate image upward from said objective lens assembly through the mirror without restricting the size of the cross-sectional area of said image.

16. A macroscope comprising:
    a body section:
    a stage connected to the body section for supporting a specimen:
    a lens system including (i) a nosepiece having (a) a first macroscopic objective lens assembly for forming a low magnification, enlarged intermediate image of the specimen on the stage, said first macroscopic objective lens assembly satisfying the following condition;

21.6 mm<2×NAOB×FLOB<31.5 mm, where NAOB is the numerical aperture of the first macroscopic objective lens assembly and FLOB is the focal length of the first macroscopic objective lens assembly, and (b) a second objective lens assembly for forming an enlarged intermediate image of the specimen on the stage; and (ii) means rotatably mounting the nosepiece in the lens system for movement between a first position, where the first macroscopic objective lens assembly is aligned with an optical axis of the lens system, and a second position, where the second objective lens assembly is aligned with the optical axis of the lens system; and an eyepiece connected to the lens system for forming a further enlarged, focused image of the specimen.

17. A macroscope according to claim 16, wherein the first macroscopic objective lens assembly satisfies the following condition:

20 mm<FLOB<150 mm, wherein the first macroscopic objective lens assembly has a working distance which satisfies the following condition:

10 mm<WDOB<100 mm, wherein the reference symbol WDOB represents a working distance for the first macroscopic objective lens assembly.

* * * * *

UNITED STATES PATENT AND TRADEMARK OFFICE
CERTIFICATE OF CORRECTION

PATENT NO. : 6,069,734
DATED : May 30, 2000
INVENTOR(S) : Yoshihiro Kawano et al.

It is certified that error appears in the above-identified patent and that said Letters Patent is hereby corrected as shown below:

<u>Title page,</u>
Item [75], Inventors, "Yoshiro" should read -- Yoshihiro --

Signed and Sealed this

Twenty-fourth Day of February, 2004

JON W. DUDAS
*Acting Director of the United States Patent and Trademark Office*